Patented May 26, 1953

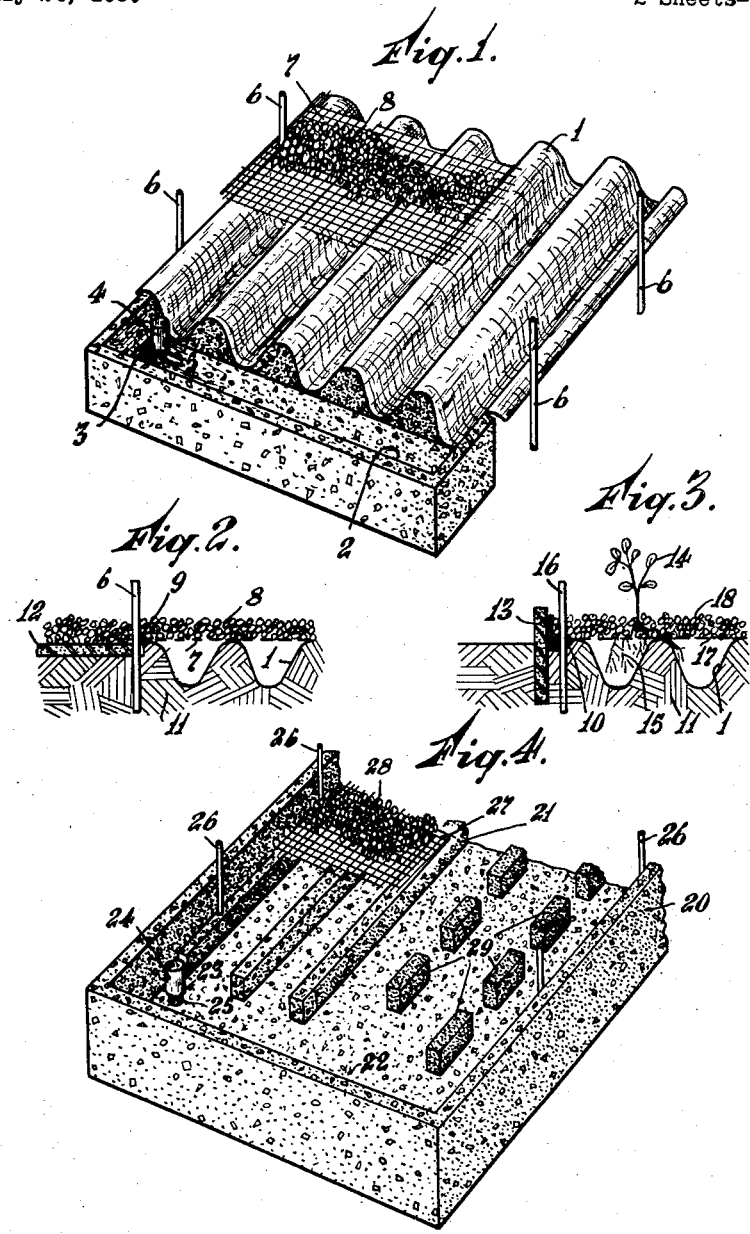

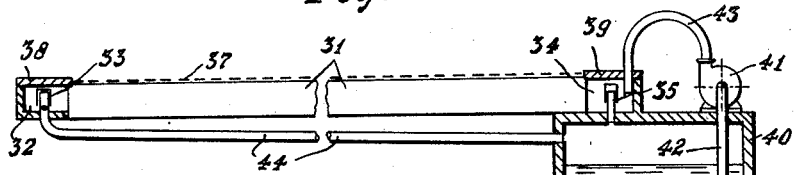
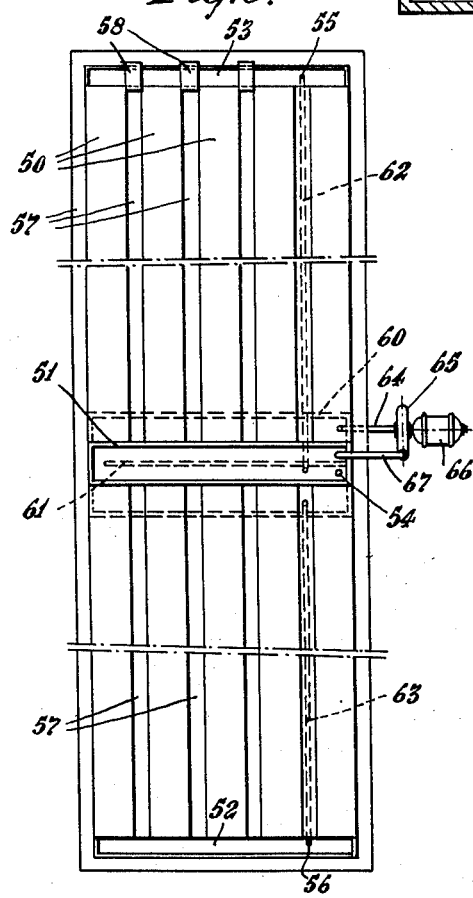

2,639,549

UNITED STATES PATENT OFFICE 2,639,549

SOILLESS CULTURE

Gerrit Jan Hillegondus Ebbinge Wubben, and Abram Arie Steiner, The Hague, Netherlands, assignors to Nederlandse Centrale Organisatie Voor Toegepast-Natuurwetenschappelijk Onderzoek, The Hague, Netherlands Application July 24, 1950, Serial No. 175,588

10 Claims. (Cl. 47—1.2)

This invention relates to the culture of plants without making use of soil, a system generally known by such terms as water culture, sand culture, gravel culture, hydroculture, and hydroponics.

Many variations of apparatus devoted to hydroculture have already been proposed and these belong mainly to two different classes. In one of those classes the plants are supported by a mass of organic material, which is held in position by a gauze or wire-cloth, a sieve bottom or like devices, the roots growing beneath said mass and dipping into a nutrient solution; this culture is called hydroculture. In other variations the bottom of the bed is immediately beneath a layer of inert material which is continuously or alternately moistened or flooded by the nutrient solution; this culture is usually named after the inert material used e. g. sand or gravel culture.

One of the objects of this invention is to provide for a new construction for the bed system particularly suitable for the first of said two classes of installations.

Another object of this invention is to provide for a new structure which is suitable for the construction of installations on a commercial scale and which is relatively cheap.

A further object of the invention is to provide for a new method of hydroculture wherein the oxygen supply to the plant-roots is increased, which method is called gravel-waterculture.

The invention embodies, in part, a combination of the two systems described above. In the invention waterproof beds are provided and at a certain distance above the bottom a perforated bottom plate or gauze is attached, upon which is placed a bed of a chemically inert material, such as gravel. In this gravel bed, the plants are placed so as to grow with their roots in the space below the gauze. From a lower reservoir or sump this space is continuously or discontinuously watered with a nutrient solution. This nutrient solution is circulated through gutters, and during this circulation aeration of the nutrient solution is provided by the free falling back of a part of the nutrient solution directly into the reservoir, while the rest of the solution after passing the bed also falls freely into said reservoir.

The invention is illustrated in connection with the accompanying drawings, in which:

Figure 1 is a perspective view of a part of a bed of an installation, wherein the layer of inert material and the bottom with openings are partly omitted.

Figure 2 gives a partly vertical cross section through a part of a bed as shown in Figure 1.

Figure 3 gives a vertical cross section of another modification.

Figure 4 gives a perspective view of another modification of the installation of Figure 1.

Figure 5 shows in vertical cross section the arrangement of a bed with a reservoir and a pump.

Figure 6 shows in horizontal diagram the arrangement of a combination of 10 beds.

Figure 1 shows a corrugated plate 1 as groundplate, a gutter 2 with an overflow-pipe 3, the latter being regulable in height by drawing out or in the outer part 4, leak holes 5 being in the pipe 3 to provide an adjustable overflow for draining away of the solution when this is not being circulated through the installation, pins 6 for holding a perforated bottom, wire-gauze 7 on which latter is laid a bed 8 of inert material, such as gravel or cinders. The inlet and outlet gutters can be made of concrete, the corrugated plate of materials such as asbestos cement. The corrugated plate can be pressed down in the concrete sidewall of gutter 2 when still in soft condition to give said sidewall the desired corrugated form. After hardening of this concrete sidewall corrugated plate 1 can be adhered to it with materials such as asbestos-bitumen.

Figure 2 shows corrugated plate 1 resting on the soil 11, a pin 6, wire-gauze 7 and gravel 8. To prevent roots from growing into the soil 11, plates or planks 12 preferably of concrete can be used as in Figure 2 lying horizontally, the pins 6 can be in seams between two planks 12 or in holes therein. The seams between two planks 12 and the seam 9 between the planks 12 and plate 1 can be filled with asbestos-bitumen or similar material. In the application according to Figure 3 is shown a corrugated plate 1 resting on the soil 11, sieve bottom 17, gravel 18, a plant 14 with roots 15, a pin 16 through the edge of sieve bottom 17, a vertical plank 13, the seam 10 between plank 13 and plate 1 being stopped up with plastic material such as asbestos-bitumen.

Figure 4 shows another application of the invention wherein a concrete box 20 with ridges 21 is used for upholding the wire-gauze 27, pins 26 are erected in the wall for holding the wire-gauze 27 on which a layer of gravel or cinders 28 is laid down. The ridges 21 leave on either side space for supply and outlet gutters, only one of these gutters 22 being shown in Figure 4, a regulable overflow-pipe 23 being in gutter 22. Instead of ridges 21 stones or blocks 29 can be used for support. The application as shown in Figure 4 gives the opportunity to raise the level of the water in the box above the wire-gauze in the growth period when the roots are not long enough; this is done by making the outer ridges higher than the inner or by giving the groundplate an extra stand-up rim. An application as shown in Figure 3 is also suitable for such raising of the level when the side walls of the gutters are made high enough. In the application according to Figures 1 and 2 in this growth period the plants must be watered by hand.

Figure 5 shows in cross section an installation with corrugated groundplate 31 and with two gutters 32 and 34 of concrete and with regulable overflow-pipes 33 and 35, wire-gauze 37, plates 38 and 39 covering gutters 32 and 34 respectively, a reservoir or sump 40, a pump 41, ducts 42 and 43 and 44, nutrient solution 45. As shown in Figure 5 the bed slopes somewhat from supply-gutter 34 to outlet-gutter 32. This slope amounts suitably to about 2 to 3 mm. per meter.

Overflow-pipe 35 enables the use of a pump of a higher capacity than is necessary for irrigating the installation. The surplus falls back immediately via overflow 35 into the reservoir where it causes intensive aeration of the solution.

Figure 6 shows the arrangement of ten beds 50 in two rows with a central supply gutter 51 and two outlet gutters 52 and 53, overflow-pipes 54, 55 and 56. Reservoir or sump 60, ducts 62, 63 and 64 are shown in dotted lines. Pump 65 with motor 66 is placed next to the bed. Footpaths 57 are between beds 50 and on the outside of these beds. Plates 58 cover the gutters only in line with footpaths 57, whereas in line with beds 50, gutters 52 and 53 are covered by the lengthened wire-gauze and gravel (not shown in this figure). These gutters have to be in dark to prevent the growing of algae. In Figure 6 only three plates 58 are shown. A wall 61 erected in reservoir 60 serves to provide circulation of the liquid in the reservoir, which is of interest for a good oxygen-distribution and supply to the solution for which duct 67 ends on the one side of wall 61 and ducts 62 and 63 and overflow-pipe 54 on the other side. An installation according to this invention can be operated by flooding the beds continuously or intermittently. The flow of nutrient solution through the beds can be regulated by variation of the overflow-pipes and by the choice of a suitable width for the leak holes. When continuously flooding, the solution is also continuously aerated and causes a continuously fresh oxygen supply to the plant roots, in contrast with the deficient air supply in a stagnant solution, in which the diffusion rate of gases in the liquid is insufficient to maintain a suitable concentration of oxygen around the plant roots. The advantage of flooding intermittently is provided by an improved direct oxygen supply to the plant roots during the time that they are not immersed in the solution. Further, the pumping requirements for aeration and the cost therefor are considerably reduced.

In a greenhouse experiments were made using the apparatus according to the invention herein for the culture of rooted cuttings as compared with a conventional gravel culture apparatus as indicated hereinabove. With the apparatus of the invention, watering was carried out discontinuously and at the same frequency as was done with the gravel culture. For both experiments the same nutrient solution was used. The experiments were made on pinks (William Simm), starting from so-called rooted cutting-material. After 6 weeks already the production of solids per plant in the apparatus of the invention was about 30% higher than in the gravel-culture. With the apparatus of the invention, the pinks gave flowers on the average 18 days sooner than with the gravel culture. With the apparatus of the invention the production of flowers after ½ year was 12% higher than with gravel culture, the quality of the flowers was the same in both cases.

We claim:

1. A water culture apparatus for the cultivation of plants comprising a groundplate provided with ridges, a perforated bottom resting on the ridges in the groundplate and spaced thereby from said groundplate, a bed of gravel placed on said perforated bottom serving as an inert plant supporting material, an inlet and an outlet gutter on opposite sides of said groundplate, a nutrient solution, a sump for storing said nutrient solution, a pump and piping line to bring the nutrient solution back to the sump, said outlet gutter provided with an adjustable overflow to control the level of the nutrient solution on said groundplate, said gutter having leak holes for draining the entire quantity of nutrient solution from the groundplate.

2. Apparatus as in claim 1 wherein the ridges are formed by loose stones.

3. Apparatus as in claim 1 wherein the groundplate is a corrugated sheet and the ridges are formed by the upward convolutions of said corrugated sheet.

4. Apparatus as in claim 1 wherein the inlet gutter is connected to the sump by an overflow pipe, so that the pump capacity being greater than required for circulating the nutrient solution from the sump to the groundplate and back to the sump causes an overflow of the nutrient solution in the inlet gutter to aerate the nutrient solution going to the sump.

5. An apparatus as in claim 1, provided with vertically extending members at the two outer sides of the groundplate to form sidewalls and having its top higher than said ridges of the groundplate.

6. An apparatus as in claim 1, wherein the adjustable overflow in the outlet gutter is situated to control the overflow level just below the upper surface of the gravelbed.

7. An apparatus as in claim 1, wherein the inlet gutter is provided with an overflow discharging into the sump to return a part of the nutrient solution from the inlet gutter back to the sump.

8. A water culture apparatus for the cultivation of plants comprising a groundplate provided with ridges, a perforated bottom resting on the ridges in the groundplate and spaced thereby from said groundplate, a bed of gravel placed on said perforated bottom serving as an inert plant supporting material, a pair of horizontal plates mounted parallel to the two opposite sides of the groundplate, said horizontal plates forming seams with said groundplate, means provided in said seams to stop them up, a sump for storing said nutrient solution, and a pump and piping line to bring the nutrient solution back to the sump.

9. In the waterculture of plants, a plurality of installations arranged in two rows, each of said installations comprising a groundplate provided with ridges, a perforated bottom resting on the ridges in said groundplate and spaced by said ridges from said groundplate, a bed of gravel placed on said perforated bottom serving as an inert plant supporting material, an inlet and an outlet gutter at opposite sides of each row, one of said gutters being the collective gutter for both rows, a nutrient solution, a sump for storing the nutrient solution, a pump and piping line for bringing the nutrient solution from the sump through the pump into the inlet gutter, and pipe lines for bringing the nutrient solution from the outlet gutter back to the sump, said outlet gutter being provided with an adjustable overflow means for controlling the level of the nutrient solution on said groundplate and having leakholes for draining the entire quantity of nutrient solution from the groundplate.

10. A structure as in claim 9, the inlet gutter being provided with an overflow, discharging into the sump for returning part of the nutrient solution from the inlet gutter back to the sump.

GERRIT JAN HILLEGONDUS
EBBINGE WUBBEN.
ABRAM ARIE STEINER.

References Cited in the file of this patent

UNITED STATES PATENTS

| Number | Name | Date |
| --- | --- | --- |
| 2,062,755 | Lyons et al. | Dec. 1, 1936 |
| 2,198,150 | Barnhart | Apr. 23, 1940 |